(12) United States Patent
Li et al.

(10) Patent No.: US 11,522,993 B2
(45) Date of Patent: Dec. 6, 2022

(54) SYSTEMS AND METHODS FOR RAPID ANALYSIS OF CALL AUDIO DATA USING A STREAM-PROCESSING PLATFORM

(71) Applicant: Marchex, Inc., Seattle, WA (US)

(72) Inventors: William Li, Sammamish, WA (US); Michael Kunugiyama, Lynnwood, WA (US)

(73) Assignee: Marchex, Inc., Seattle, WA (US)

( * ) Notice: Subject to any disclaimer, the term of this patent is extended or adjusted under 35 U.S.C. 154(b) by 65 days.

(21) Appl. No.: 17/128,692

(22) Filed: Dec. 21, 2020

(65) Prior Publication Data

US 2021/0329124 A1 Oct. 21, 2021

Related U.S. Application Data

(60) Provisional application No. 63/012,004, filed on Apr. 17, 2020.

(51) Int. Cl.
*H04M 3/22* (2006.01)
*H04M 3/42* (2006.01)
(Continued)

(52) U.S. Cl.
CPC .......... *H04M 3/2218* (2013.01); *G06N 20/00* (2019.01); *G06Q 10/06398* (2013.01); *G06Q 10/10* (2013.01); *G06Q 30/016* (2013.01); *G06Q 30/0201* (2013.01); *G10L 15/083* (2013.01); *G10L 15/26* (2013.01); *G10L 15/30* (2013.01);
(Continued)

(58) Field of Classification Search
CPC ........... H04M 3/2218; H04M 3/42221; H04M 3/5166; H04M 3/5183; H04M 2203/555; G06N 20/00; G06Q 10/06398; G06Q 10/10; G06Q 30/016; G06Q 30/0201; G10L 15/083; G10L 15/26; G10L 15/30; G10L 2015/088; G10L 25/63; H04L 65/608; H04L 65/80
See application file for complete search history.

(56) References Cited

U.S. PATENT DOCUMENTS 7,349,976 B1 * 3/2008 Glaser .................... H04L 65/70
709/219
9,161,272 B2 * 10/2015 Ofir ..................... H04L 65/1069
(Continued)

FOREIGN PATENT DOCUMENTS

CA 2699437 A1 * 3/2009 ......... H04L 63/0457
WO WO-2009029314 A1 * 3/2009 ........... G06F 17/289

*Primary Examiner* — Akelaw Teshale
(74) *Attorney, Agent, or Firm* — Perkins Coie LLP

(57) ABSTRACT

A call analytics system and associated methods that can be used to rapidly analyze call data and provide conversational insights. The call analytics system receives audio call data of a phone call between a customer and an agent of a business, and converts the call data into one or more messages for handling by a distributed stream-processing platform. In some embodiments, the stream-processing platform is the Apache Kafka platform. The distributed platform processes the messages and communicates with various software modules to generate a variety of conversational insights. When processed by a stream-processing platform, certain analyses can occur in parallel which allows conversational insights to be provided to the businesses shortly (e.g., within seconds) after the call data is received.

20 Claims, 5 Drawing Sheets

(51) Int. Cl.
  *G10L 15/30* (2013.01)
  *G10L 15/26* (2006.01)
  *G06Q 30/00* (2012.01)
  *G06Q 30/02* (2012.01)
  *G06Q 10/10* (2012.01)
  *G06Q 10/06* (2012.01)
  *G06N 20/00* (2019.01)
  *G10L 15/08* (2006.01)
  *H04L 65/65* (2022.01)

(52) U.S. Cl.
  CPC ........ *H04L 65/65* (2022.05); *H04M 3/42221* (2013.01); *G10L 2015/088* (2013.01)

(56) References Cited

U.S. PATENT DOCUMENTS

| | | | | |
|---|---|---|---|---|
| 2006/0268847 | A1* | 11/2006 | Halbraich | H04L 65/104 370/352 |
| 2007/0280127 | A1* | 12/2007 | Connor | H04L 65/1101 709/224 |
| 2009/0175425 | A1* | 7/2009 | Lee | H04M 1/72433 379/88.11 |
| 2011/0055585 | A1* | 3/2011 | Lee | H04L 9/3218 713/183 |
| 2015/0117397 | A1* | 4/2015 | Ofir | H04L 65/611 370/331 |
| 2017/0251212 | A1* | 8/2017 | Swaminathan | H04N 19/196 |
| 2019/0268214 | A1* | 8/2019 | Maes | H04L 41/5074 |

* cited by examiner

SYSTEMS AND METHODS FOR RAPID ANALYSIS OF CALL AUDIO DATA USING A STREAM-PROCESSING PLATFORM

CROSS-REFERENCE TO RELATED APPLICATION(S)

This application claims the benefit of U.S. Provisional Patent Application No. 63/012,004 entitled "SYSTEMS AND METHODS FOR RAPID ANALYSIS OF CALL AUDIO DATA USING A STREAM-PROCESSING PLATFORM," filed Apr. 17, 2020, which is incorporated herein by reference in its entirety

BACKGROUND

Businesses in industries such as financial services, insurance, travel and hospitality, retail, and cable and satellite television rely on voice contact with customers to answer client inquiries, make sales, and provide technical support. For such businesses, every contact with a customer is an opportunity to make a lasting impression, to gather customer data, and/or to strengthen a customer's loyalty to the business. With regard to customer calls, it is desirable to know whether customers are receiving quality customer service that includes accurate information, adherence to professional communication standards, and a conveyance of a feeling of being valued by the business. Furthermore, it is desirable to receive insights into caller intent or sentiment to better assess customer pain points and needs. Conventional call analytics systems, however, include a delay between the time call audio data is collected and the time these insights are made available to businesses. Often, the delay is on the order of minutes after the call audio data is collected, meaning that a customer call has already terminated or negatively escalated by the time that businesses are provided the insights needed to intervene. In turn, businesses often miss out on sales opportunities, on maintaining or repairing customer relations, and/or on making a positive lasting impression with a customer. Thus, there is a need for an improved system and associated methods that can provide rapid analysis of call audio data to enable businesses to identify communication signals and act on key conversational insights in near real-time to accelerate sales and ensure positive customer experiences.

BRIEF DESCRIPTION OF THE DRAWINGS

Many aspects of the present disclosure can be better understood with reference to the following drawings. Emphasis is placed on illustrating clearly the principles of the present disclosure. Thus, the drawings should not be taken to limit the disclosure to the specific embodiments depicted, but are for explanation and understanding only.

DETAILED DESCRIPTION

Figure 1:
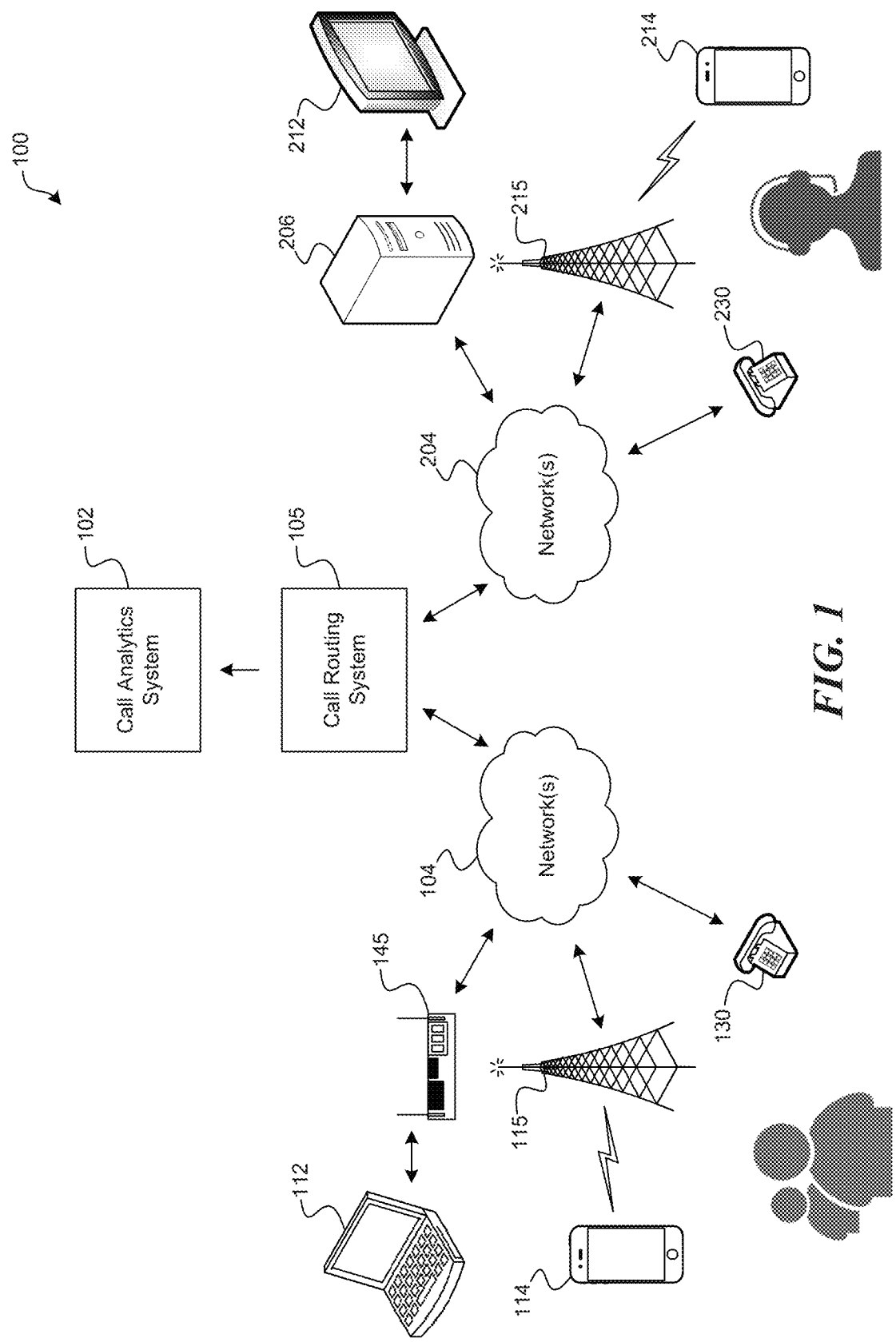
FIG. 1 is a block diagram of a representative environment in which a rapid call analytics system operates.

A call analytics system (and associated methods) that can be used to rapidly analyze call data and provide conversational insights is disclosed herein. In some embodiments, the call analytics system receives audio call data of a phone call between a customer and an agent of a business, and converts the call data into one or more messages for handling by a distributed stream-processing platform. In some embodiments, the stream-processing platform is Apache Kafka™ running on a cloud services provider platform. The distributed platform processes the messages utilizing various software modules to generate a variety of conversational insights. Examples of conversational insights that can be generated by the call analysis include call classifications (e.g., sales v. service), indications of customer intent and/or sentiment, and indications of agent performance and adherence to scripts. When processed by a stream-processing platform, certain analyses can occur in parallel which allows conversational insights to be provided to the businesses shortly (e.g., within seconds) after the call data is received. Indeed, if the call data is provided concurrent with a call, in some circumstances the system can provide analysis results before the call has ended. In this manner, businesses are provided insights regarding conversations with customers as they occur, allowing these businesses to act on or intervene within conversations with their customers to accelerate sales and ensure positive customer experiences.

In some embodiments, the call data and initial processing results is also stored in a data warehouse and later accessed for purposes of supplemental call analysis. By allowing certain analyses to be performed immediately, while other analyses can be performed in a less time-sensitive matter, the disclosed architecture allows business owners to structure various call analysis services in a manner that best meets their needs for understanding interactions with customers.

Because the call analytics system of the present technology first converts call data of a phone call to messages before analyzing the call data, the call analytics system provides an added benefit of accurately processing audio data even though that audio may have originally been transmitted using lossy communication protocols (e.g., VoIP, stream control transmission protocol (SCTP), transmission control protocol (TCP), etc.). For example, there is a known disadvantage in processing VoIP call audio data because VoIP data is inherently lossy. That is, VoIP call audio data is transmitted in a plurality of Real-time Transport Protocol (RTP) packets that each contain a number of audio samples of call audio data. In accordance with RTP networking protocol, each RTP packet must be delivered to and decoded by a call audio processor on a timely basis to realize good audio quality. Any packet that is delayed, lost, or reordered is discarded for the purposes of processing, and the audio quality of the call thereby suffers.

In contrast, the call analytics system of the present technology converts the VoIP RTP packets into messages that have a lossless format before processing the VoIP call data. As such, VoIP data is no longer irrecoverably lost during delivery of the call data to various processor modules. Furthermore, the call analytics system of the present technology can reorder VoIP RTP packets within and/or across messages before, during, and/or after processing the messages. As a result, RTP packets that were delayed or reordered before conversion into lossless messages can be processed and reordered (rather than discarded) by the call analytics system of the present technology, thereby improving audio quality of the analyzed VoIP call over conventional call analytics systems.

Various embodiments of the technology will now be described. The following description provides specific details for a thorough understanding and an enabling description of these embodiments. Some well-known structures or functions may not be shown or described in detail, so as to avoid unnecessarily obscuring the relevant description of the various embodiments. A person skilled in the art, however, will understand that the technology may have additional embodiments and that the technology may be practiced without several of the details of the embodiments described below with reference to FIGS. 1-4. The terminology used in the description presented below is intended to be interpreted in its broadest reasonable manner, even though it is being used in conjunction with a detailed description of certain specific embodiments of the invention.

FIG. 1 is a block diagram illustrating a representative environment 100 in which a call analytics system 102 configured in accordance with various embodiments of the present technology operates. As shown, the left portion of FIG. 1 depicts customers that communicate with businesses, and the various customer communication devices that can be used for purposes of communication, including personal computers or laptops 112, mobile devices 114 (e.g., mobile phones, tablets, etc.), and landline telephones 130. The customer communication devices are used by customers to contact and/or otherwise interact with (e.g., place calls to or receive calls from) businesses, their agents, and/or systems that provide self-help such as interactive voice response (IVR) systems. The right side of FIG. 1 depicts systems that are used by businesses to receive and respond to customer communications, including personal computers or laptops 212, mobile devices 214 (e.g., mobile phones, tablets, etc.), servers 206, and landline telephones 230. The business communication devices are used by businesses and/or their agents (e.g., call centers that manage calls for the businesses) to interact with customers.

The communication devices of the environment 100 are connected to and communicate through one or more networks 104 and/or 204. Networks 104 and/or 204 may be any type of public or private, wired or wireless, network connection suitable for transporting call data between nodes. The communication devices could be connected through cellular networks 115 and/or 215 and/or through the public switch telephone network (PSTN) to the business systems. In some embodiments, the Internet is one of the networks 104 and/or 204 used to provide connectivity. For example, a customer may place a call to a business over the Internet in accordance with the Voice-over-Internet Protocol (VoIP) via computer 112 and access point 145 (e.g., WiFi routers, WiMax routers, and/or other femtocell access points). As will be described in additional detail herein, communication over the network 104 is conducted in accordance with the Session Initiation Protocol (SIP), the Real-Time Transport Protocol (RTP), and/or other appropriate communication protocols. In these and other embodiments, networks other than the Internet may also be used. For example, the networks 104 and/or 204 can include dedicated terrestrial or satellite wireless networks.

As shown in FIG. 1, calls placed by customers or businesses on caller communication devices are routed to respective callee communication devices via a call routing system 105. In some embodiments, the call routing system 105 includes various network elements known in the art, such as session border controllers and call session controllers, for establishing call sessions between customers and businesses. For example, the call routing system 105 can include a software defined telecom stack, such as FreeSwitch. When the call routing system 105 connects a customer communication device to a business communication device, the call routing system 105 also routes call audio data of the connected call to the call analytics system 102. That is, the call routing system 105 generates a forked (replicated) audio stream that is provided to the call analytics system 102. For calls placed between customers and businesses, each call typically has two channels. One channel contains audio data associated with the customer. The other channel contains audio data associated with the agent of the business. For purposes of this description, "audio data" may therefore be associated with a customer, an agent, or both the customer or agent as allowed by the context.

Call audio data that is routed from customer to business operator is inherently imperfect because the various communication protocols (e.g., VoIP, SCTP, TCP, etc.) used to carry voice data allow for packet loss. For example, a conventional VoIP audio call involves call setup via a new SIP session, followed by the transmission of a stream of audio samples sent in RTP packets. Each packet includes a specified number (e.g., ten) of audio samples and includes a sequence number and a time signature. In accordance with RTP, each packet must be delivered and decoded on a timely basis to realize good audio quality. Any packet that is delayed, lost, or reordered is discarded for the purposes of processing, and the audio quality of the call suffers. Such a loss in quality is acceptable for spoken conversations because the human ear and brain will often fill in or interpret gaps in audio in a way that still conveys the correct message to the user. In contrast, however, that same loss of data can be problematic to machine algorithms that are designed to analyze speech. In that case, loss of packets can detrimentally impact the quality of the analysis and the usability of the speech samples.

To help mitigate the lossy nature of audio transmission protocols, and as discussed in greater detail below, the call analytics system 102 receives forked call audio data from the call routing system 105 and converts the audio data into a lossless messaging format. The call analytics system 102 then processes the audio data as a message stream in a stream-processing platform. For example, the call analytics system 102 can process messages in the message stream to convert the call audio data into text and/or store the text for subsequent processing. In these and other embodiments, the call analytics system 102 can perform keyword spotting and/or use artificial intelligence services to predict customer intent and/or sentiment. The call analytics system 102 can then rapidly provide these insights to businesses such that businesses are able to act while still engaging with a customer over the phone. In this context, "rapidly" means that insights can be provided during a call or shortly (e.g., in five seconds or less) after a call has concluded.

Figure 2:
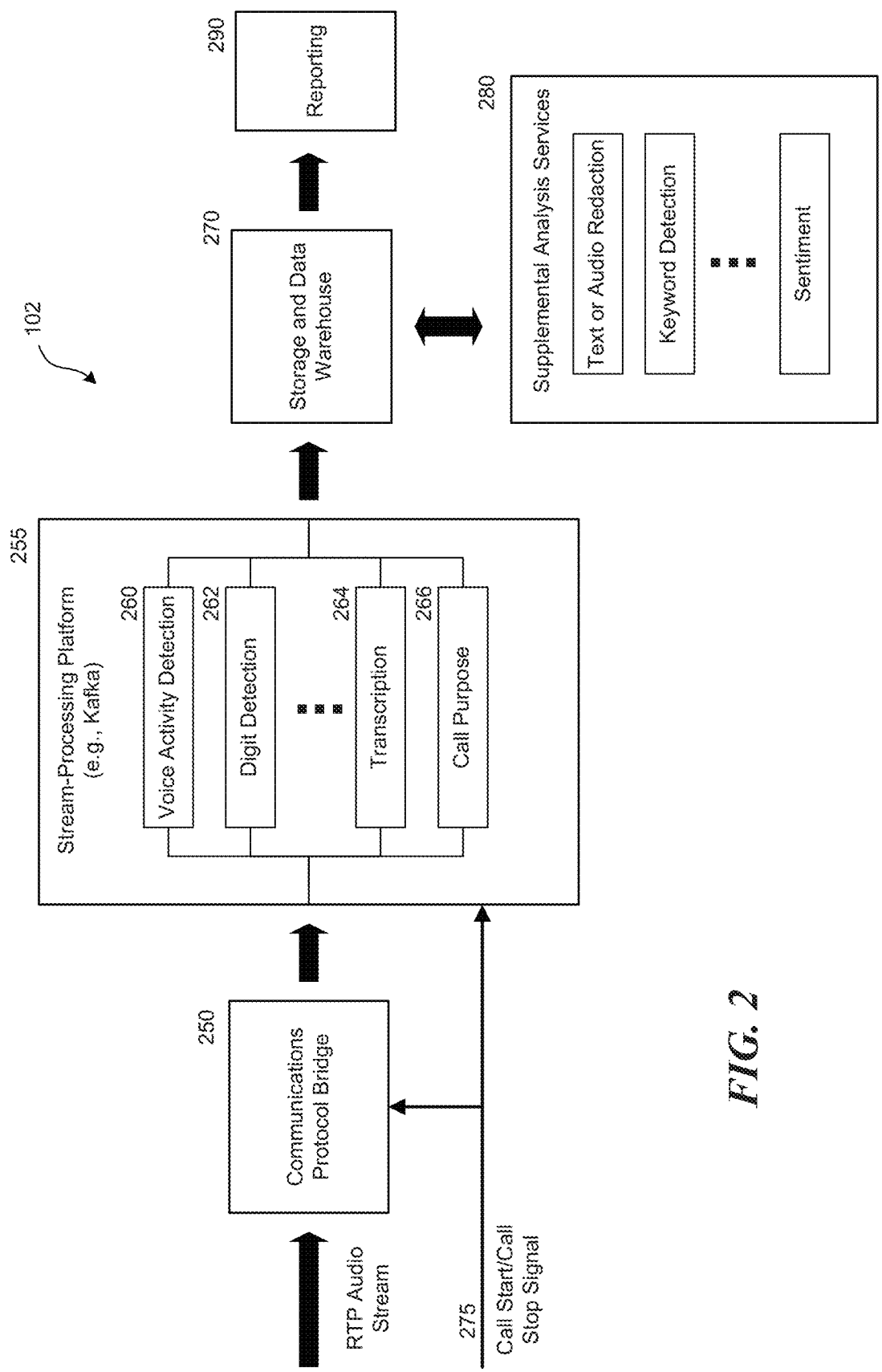
FIG. 2 is a block diagram of a rapid call analytics system configured in accordance with various embodiments of the present technology.

FIG. 2 is a block diagram of the call analytics system 102. As shown, the call analytics system 102 includes one or more functional modules that are utilized by the call analytics system to analyze call audio data received from the call routing system 105 (FIG. 1). The call analytics system 102 includes hardware (not shown) for executing software related to one or more of the illustrated modules, such as memory and other storage for storing software code, one or more central processing units (CPU) for executing stored code, and various input and output devices to enable system control. Although not required, aspects and implementations of the system may be embodied in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The call analytics system 102 of FIG. 2 includes a communication protocol bridge (CPB) module 250 that receives forked call audio data from the call routing system and transforms the data for further processing by a stream-processing platform 255. In some embodiments, the CPB module 250 receives call audio data in RTP-formatted media streams. The CPB module 250 converts the received call audio data into a lossless message format (e.g., into one or more messages in a message stream) to be processed by the stream-processing platform 255. For example, in the case of a VoIP call, the call analytics system 102 can receive a stream of audio samples from the call routing system 105 (FIG. 1) in accordance with the RTP networking protocol. In turn, the CPB module 250 converts the packets from the RTP networking protocol into a lossless messaging format.

Figure 3A:
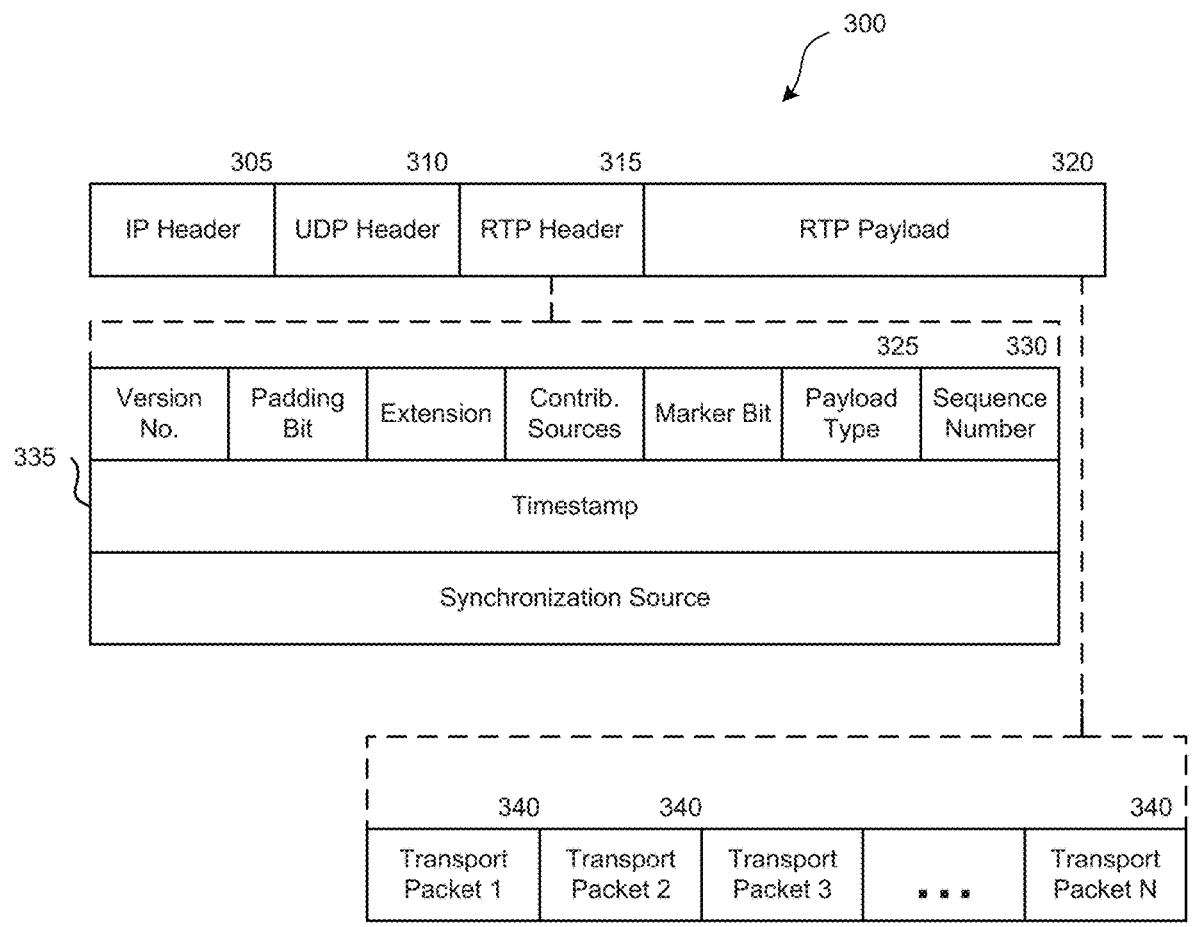
FIG. 3A is a schematic diagram of a Real-time Transport Protocol (RTP) packet structure that is used for Voice over Internet Protocol (VoIP) sessions.

FIG. 3A is a schematic diagram of the structure of an RTP packet 300 that is used for VoIP sessions. For transmission, the RTP packet is encapsulated in a UDP (User Datagram Protocol) packet, which means that an IP header 305 and UDP header 310 are prepended to the RTP packet. The RTP packet includes an RTP header 315 and an RTP payload 320. As depicted in FIG. 3A, the RTP header 315 includes a number of fields to allow for transmission and reconstruction of the VoIP stream. In particular, the header includes a payload type field 325, a sequence number field 330 and a timestamp field 335. The payload type field 325 identifies the format of the RTP payload, thereby allowing receiving applications to interpret the received payload. The sequence number field 330 contains a count that is incremented by one for each RTP data packet sent, and is used by the receiver to detect packet loss and to restore packet sequence. And finally, the timestamp field 330 is used by the receiving device to play back received samples at the proper intervals. Following the RTP header 315 is the RTP payload 320, which is comprised of one or more transport packets 340 which contain multimedia data. RTP supports a wide range of multimedia formats (e.g., MPEG, DTMF, G.726, etc.) that may be selected depending on the particular supported VoIP applications. As such, each transport packet 340 contains audio data encoded in a corresponding multimedia format associated with the audio stream.

Figure 3B:
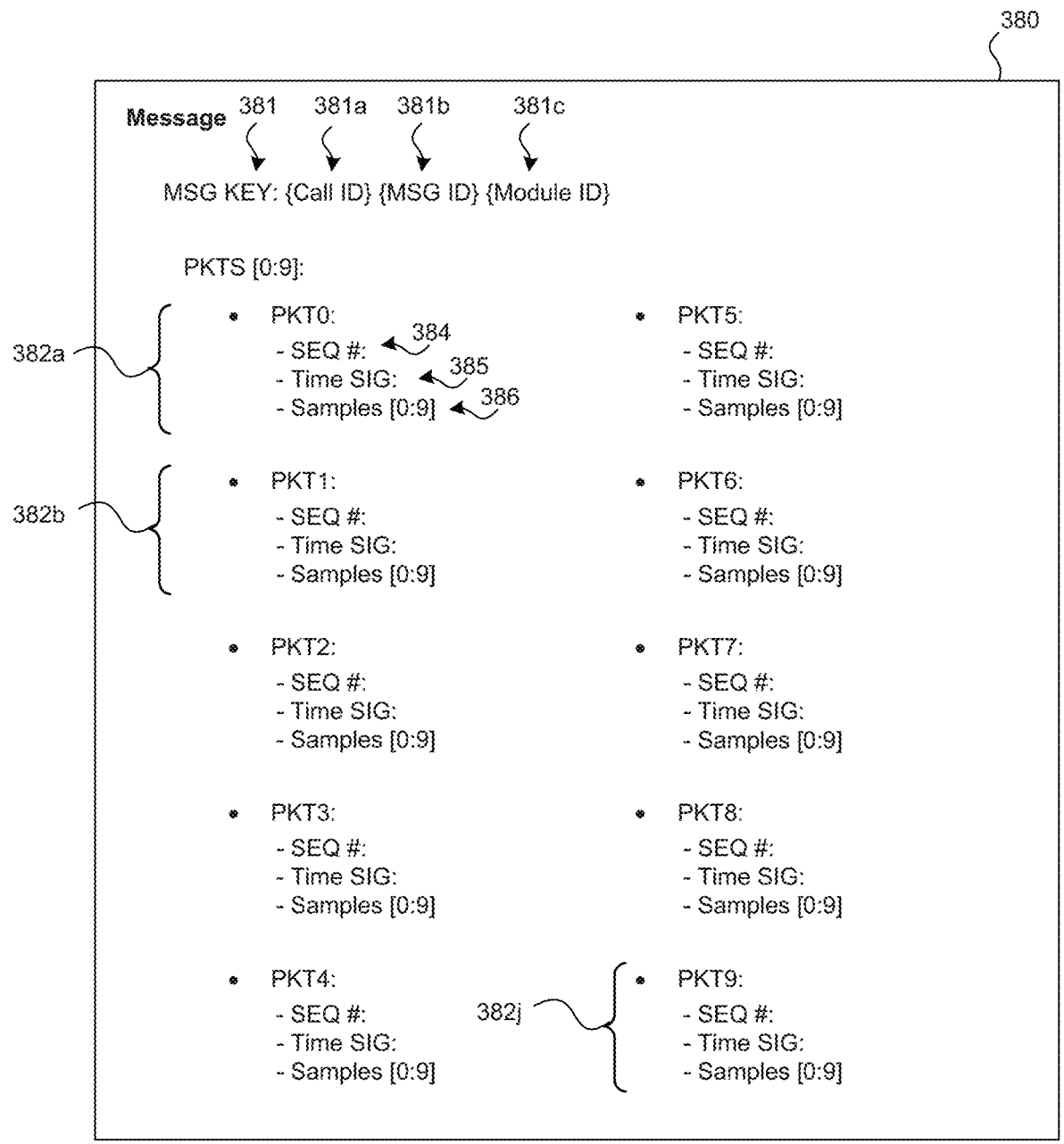
FIG. 3B is a schematic diagram of a message generated from received RTP packets in accordance with various embodiments of the present technology.

FIG. 3B is a schematic diagram of a message 380 generated by the CPB module 250 (FIG. 2) based on received VoIP RTP packets in accordance with various embodiments of the present technology. When VoIP RTP packets are received, the CPB module unpacks the UDP packets and generates one or more messages 380 with the encoded audio data. As shown, the message 380 starts with a message key 381, which includes a call identifier field 381a, a message identifier field 381b and/or a module identifier field 381c. The call identifier field 381a is an identifier that is generated by the CPB module 250 and used to correlate the message 380 with other messages generated using call audio data from the same phone call. That is, all messages that are generated from a phone call audio stream will have the same caller identifier so that the messages can associated together and collectively analyzed. The message identifier field 381b is an identifier that is assigned by the CPB module 205 and uniquely identifies each message from other messages that are associated with a call ID. The message ID is therefore used to identity the specific message 380 within a stream of messages. In other words, the call analytics system 102 can use the message key 381 to reference a phone call and an individual message 380 within a message stream of that phone call.

The message key 381 of the message 380 can also include a module identifier field 381c that can be used by the call analytics system 102 to correlate the same message 380 across multiple modules of the call analytics system 102. For example, as described in greater detail below, the message 380 can be processed in parallel by several consumer modules (e.g., media modules, analytics modules, etc.) of the call analytics system 102, and each module can produce an output. In some embodiments, the module identifier field 381c can be used to enable geographic forwarding routing techniques of messages 380 to various modules of the call analytics system 102. In these and other embodiments, as a module of the call analytics system 102 processes a message 380, the module can update the module identifier field 381c with an identifier unique to the module. In turn, the call analytics system 102 can correlate the output of the module with the outputs of the other modules of the call analytics system 102 using the call identifier field 381a and/or the message identifier field 381b of the message key 381, and can identify which module produced an output using the module identifier field 381c of the message key 381.

Following the message key 381, the message 380 includes a variable number of audio data packets 382a, 382b ... 382j. As the CPB module 250 of the call analytics system 102 receives RTP packets 300 (FIG. 3A) from the call routing system 105 containing audio data, the CPB module 250 populates message 380 by adding the received audio data to the message. For each packet of audio data added to message 380, the CPB module 250 includes a sequence number 384 that is derived from the sequence number field 330 of the UDP packet, a time signature 385 that is derived from the timestamp field 335 of the UDP packet, and audio samples 386 that are carried in transport packets 340. The audio data packets 382a, 382b ... 382j are added to the message 380 on a space-available basis. In the illustrated embodiment, the message 380 includes space for ten audio data packets 382a, 382b ... 382j (packets PKT0-PKT9), with each packet including ten audio samples 386 (samples [0:9]). If each audio sample represents approximately 2 ms of call audio data (which is typical for certain RTP packets), the message 380 illustrated in FIG. 3 therefore represents up to approximately 200 ms of call audio data associated with a phone call.

In some embodiments, as each RTP packet 300 is received from the call routing system 105, the CPB module 250 serially populates the received call audio data to each audio data packet 382a, 382b . . . 382j. In other words, the order of the audio data packets 382a, 382b . . . 382j in message 380 is the same order as the audio data is received in the RTP packets. In other embodiments, the CPB module 250 may utilize the sequencing data in sequence number field 330 to re-order the received RTP packets. Audio data in RTP packets 300 that are associated with the 200 ms window of each message 380 may be re-ordered so that the audio data packets 382a, 382b . . . 382j are added to the message 380 in the correct sequence order, regardless of the order that they were originally received in the RTP packets.

Although the message 380 is illustrated with space for ten audio data packets 382a, 382b . . . 382j in FIG. 3B, messages 380 configured in accordance with other embodiments of the present technology can include space for a greater or lesser number of audio data packets, can include audio data packets having a greater or lesser number of audio samples 386, and/or can include audio samples 386 representing a greater or lesser amount of call audio data. Furthermore, the number of audio data packets 382a, 382b . . . 382j per message 380 can vary. For example, if the CPB 250 receives less than the maximum number of audio data packets 382a, 382b . . . 382j per message 380 (e.g., less than ten audio data packets) from the call routing system 105 in the time allotted for generating and transmitting the message 380, the CPB module 250 can transmit the message 380 with less than the maximum number of audio data packets. In such an event, the CPB module 250 may add audio data reflecting pink noise to completely fill the remaining packets. Additionally, or alternatively, if data that would normally be added to an audio data packet 382a, 382b . . . 382j is lost (e.g., during transmission of the RTP packets 300 between the call routing system 105 and the call analytics system 102), the CPB module 250 in some embodiments can identify that the audio data is missing (e.g., using the sequence numbers 330 and timestamp 335 of RTP packet 300). In these embodiments, the CPB module 250 can inject pink noise and/or other information into the message 380 to compensate for the missing audio data. In other words, in the event that the CPB module 250 determines that the audio data normally used to populate an audio data packet 382a, 382b . . . 382j is lost or missing, CPB module 250 can transmit the message 380 with nine audio data packets 382a, 382b . . . 382j that contain received audio data and the tenth audio data packet with pink noise or other information to compensate for the missing audio data.

Additionally, or alternatively, an encoder or other components of the call analytics system 102 upstream from the CPB module 250 can manipulate RTP packets 300 prior to the RTP packets being used to construct messages 380. For example, the encoder can reorder the RTP packets 300 in accordance with the sequence numbers 330 and the timestamps 335 of the RTP packet. In these and other embodiments, the encoder can inject pink noise and/or other information into one or more RTP packets 300 (e.g., to compensate for an RTP packet that was lost or went missing during transmission to the CPB module 250 of the call analytics system). In these and still other embodiments, the encoder can remove RTP packet, e.g., in the event that the encoder determines that an inappropriate RTP packet has been received.

Although not shown in FIG. 3B, the CPB module 250 in some embodiments can add additional information to the message 380. For example, the CPB module 250 can add information that designates a payload type of the audio data packets 382a, 382b . . . 382j included in the message 380. As a specific example, the CPB module 250 can include information indicating that the payload of an audio data packet 382a, 382b . . . 382j includes pulse code modulation μ-law (PCMU) audio data or dual tone multi-frequency (DTMF) button presses. Such information can be useful to identify appropriate modules of the call analytics system 102 for processing of the message 380. It will be appreciated that the audio data in audio data packets 382a, 382b . . . 382j can be any format of audio data that is carried in RTP packets.

After the CPB module 250 fills the message 380 with audio data packets 382a, 382b . . . 382j and/or after a specified time allotted for generating the message 380 has elapsed, the CPB module 250 transmits the message 380 to the stream-processing platform 255 (FIG. 2) of the call analytics system 102. In this manner, the CPB module 250 of the call analytics system 102 converts call audio data from a lossy communication format into a lossless messaging format and provides the call audio data in messages to the stream-processing platform 255 for further processing.

In some embodiments, processing by the CPB module 250 and the stream-processing platform 255 is assisted by a call start or a call stop signal 275 that is received in conjunction with the forked call audio data from the call routing system 105. When a new connection is established in the call routing system 105, the system can generate and transmit a call start signal to the CPB module 250 and/or the system-processing platform 255 to initiate or facilitate certain processes. Similarly, when a hang-up signal from a carrier is detected by the call routing system 105, the system can generate and transmit a call stop signal to the CPB module 250 and/or the system-processing platform 255 to terminate or facilitate certain processes. Although processing by the CPB module 250 and stream-processing platform 255 does not depend on the receipt of those signals, when available they can help call processing.

Referring again to FIG. 2, the stream-processing platform 255 of the call analytics system 102 is a distributed streaming platform. For example, the stream-processing platform 255 can include Apache Kafka® running on an event streaming platform. Representative platforms include, but are not limited to, commercially available SAAS services such as Confluent Platform or Confluent Cloud. In operation, the stream-processing platform 255 is configured to rapidly process call audio data included in a stream of messages 380 (FIG. 3) received from the CPB module 250. Rapid processing is achieved since message streams can be replicated and processed in parallel via one or more analytics modules. For example, the stream-processing platform 255 can process in parallel messages 380 received from the CPB module 250 using one or more of various analytics modules. As shown in FIG. 2, examples of analytics modules include voice activity detection module 260, digit detect module 262, transcription module 264, and call purpose module 266. The voice activity detection module 260 converts call audio data (e.g., PCMU audio data) for a customer channel, an agent channel, or both channels of a call into one or more utterances of speech (e.g., five second utterances) for subsequent processing. The digit detect module 262 analyzes DTMF audio data to determine button press values and/or to convert the DTMF audio data into one or more other data formats. The transcription module 264 processes call audio data in the messages 380 to generate a transcription of the audio data for the customer channel, the agent channel, or both. The call purpose module 266 analyzes audio data to analyze intent or likely outcome of a call (e.g., product inquiry, product sale, complaint). That is, the call purpose module 266 uses artificial intelligence/machine learning-based models to analyze metadata of a phone call (e.g., start and stop times, duration, patterns of interaction between a customer and an agent, etc.) to predict outcomes of a call and customer intent. All of the noted analytics modules may utilize artificial intelligence or machine learning techniques to train the modules for their intended purposes.

The messages 380 in the message stream that are transmitted to the stream-processing platform 255 and the outputs of the analytics modules (e.g., the modules 260, 262, 264, and/or 266) are stored in a data warehouse 270 of the call analytics system 102. In some embodiments, data warehouse 270 includes a cloud object storage service, such as Amazon's Simple Storage Service (S3™). In some embodiments, the data warehouse 270 includes a SAAS data storage platform such as a structured query language (SQL) cloud data warehouse. The outputs of analytics models may be immediately used to provide call insights to the business entity, where such insights may be provided during a call or soon after a call is completed.

Call data (e.g., audio and/or text data) stored in the data warehouse 270 can be further processed by one or more other supplemental analysis modules 280 of the call analytics system 102. Modules may be constructed to perform specific analyses on call data on a per-call or on a groups of calls basis. The supplemental analysis may provide greater insights into the call data, yet may be executed on a less-time sensitive basis. For example, the call data may be stored and later processed in batches to provide additional insight into the content, efficacy or outcome of calls. Modules used in the supplemental analysis may include, for example, modules configured to perform the following functions:

Keyword analysis to spot keywords spoken by a customer and/or an agent during a phone call.
Intent analysis to identify phone calls involving customers exhibiting strong inclinations to purchase products or services (e.g., based on pre-configurable keywords) and/or customers who might be good candidates for retargeting advertisements.
Mishandled call analysis to identify phone calls that are mishandled by sales agents (e.g., phone calls that are abandoned by customers whose phone calls went unanswered; who were placed on hold, were transferred, or were directed to an interactive voice recording (IVR) or voicemail; or whose phone calls did not result in a sale because of a lack of appointment availability, a product being out of stock, or a need to cancel an order or appointment).
Sales versus service analysis to classify a customer call as whether it is likely a sales or servicing opportunity.
Sentiment analysis to determine/predict caller sentiment and identify potential customer churn.
Script performance analysis to track an agent's performance against scripts used, for example, in customer service guidelines.
Redaction analysis to automatically remove text containing personal information (e.g., credit card and social security information) from call transcriptions, and/or to automatically remove audio containing personal information from call recordings of the audio data.

The number and types of supplemental analysis modules that are implemented by the call analytics system 102 will depend on the type of audio call data being analyzed, and the services that businesses request based on that data. In some embodiments, the supplemental analysis modules utilize artificial intelligence/machine learning-based techniques in order to perform the desired analysis.

As shown in FIG. 2, the call analytics system 102 further includes a reporting module 290 that reports various information generated by the analytics modules of the call analytics system 102. In some embodiments, the reporting module 290 outputs the information for manipulation and display. For example, the reporting module 290 can format and display the various outputs produced by the analytics modules and/or other information to a business on a dashboard or graphical user interface (GUI) presented on a display. In this manner, businesses are provided insights into customer calls in sufficient time to allow the business to act while engaging with a customer over the phone and/or shortly thereafter.

Figure 4:
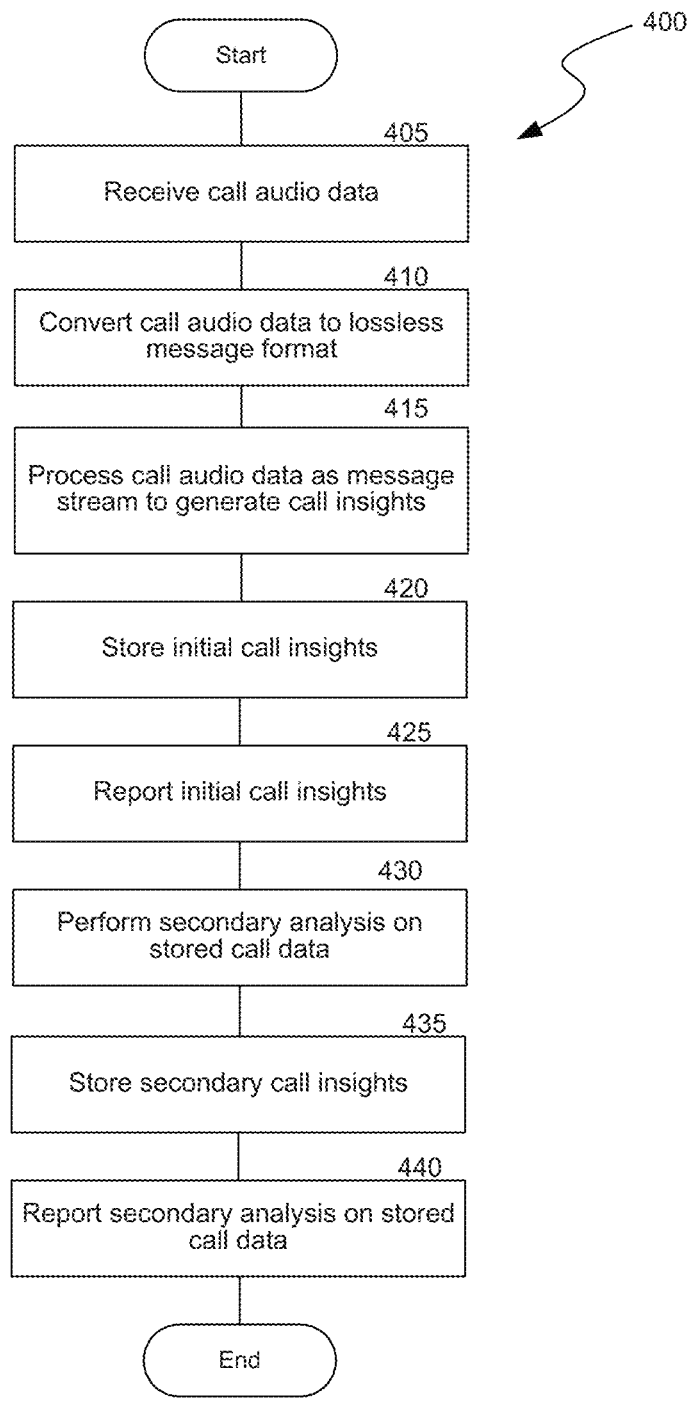
FIG. 4 is a flow diagram illustrating a routine for rapid analysis of call data in accordance with various embodiments of the present technology.

FIG. 4 is a flow diagram illustrating a routine 400 that is executed by the call analytics service 102 for rapidly analyzing call data of a customer call in accordance with various embodiments of the present technology. The routine 400 is executed, at least in part, by various components of the call analytics system. For example, all or a subset of one or more of the steps of the routine 400 can be carried out by a communication protocol bridge module 250, a stream-processing platform 255, one of more analytics modules, supplemental analysis modules, and/or a reporting module 290 of the call analytics system.

At block 405, the routine 400 receives call audio data of a customer call. In some embodiments, the customer call is initiated by a customer contacting a business or a business's agent. In other embodiments, the customer call is initiated by a business or a business's agent contacting a customer. In either case, the call audio data can be received from a call routing system that helps establish a communication session between the customer and the business's agent. In some embodiments the call audio data is received at a communication protocol bridge module 250 of the call analytics system. The call audio data can be VoIP or other call audio data and/or can be formatted in accordance with one or more communication protocols, such as the RTP networking protocol, the SIP protocol, or another appropriate communication protocol.

At block 410, the routine 400 converts the call audio data into a lossless message format. For example, the routine 400 can receive call audio data at block 405 as a plurality of RTP packets that each include one or more audio samples of the customer call. In this example, the routine 400 can add the audio data contained in the RTP packets to one or more messages in accordance with the discussion of FIGS. 2, 3A and 3B above. As one or more messages are constructed, the messages are transmitted to a stream-processing platform 255 as a message stream.

At block 415, the routine 400 processes the converted call audio data as a message stream to generate call insights. In some embodiments, the routine 400 processes the converted call audio data in parallel using one or more analytics modules enabled by the stream-processing platform. For example, one or more messages of the message stream can be processed in parallel to transcribe the voice data, detect touchtone digits in the voice data, detect voice activity, or other functions as are described in FIG. 2 above.

At block 420, the routine 400 stores the messages of the message stream (i.e., the underlying call data), the outputs of the analytics modules, and/or other related information in the memory and data storage warehouse 270 of the call analytics system.

At block 425, the routine 400 reports all or a subset of the insights generated at block 415 to the business and/or the business's agent. For example, the routine 400 can access, analyze, format, or otherwise manipulate one or more of the outputs of the analytics modules to generate a report of initial insights into the customer call (e.g., using a reporting module of the call analytics system). The routine 400 can display the report on a dashboard or graphical user interface (GUI) presented to the business or the business's agent on a display. In some embodiments, the routine 400 can provide the insights to the business or to the business's agent as information becomes available (e.g., without waiting for outputs of other analytics modules). In doing so, the routine 400 allows initial insights to be provided to the agent either during a call or shortly after a call has ended.

At block 430, the routine 400 performs a secondary analysis of the stored call data. That analysis can include, for example, certain types of text redaction, audio redaction, sentiment analysis, etc. In some embodiments, the routine 400 can use an output of one analytics module (e.g., keyword spotting) to inform or otherwise affect an output of another analytics module (e.g., sentiment analysis, agent script, high intent, etc.). The data generated by the secondary analysis may also be used to train machine learning models to improve system operation.

At block 435, the routine 400 stores the outputs of the secondary analytics modules, and/or other related information in the memory and data storage warehouse 270 of the call analytics system.

At block 440, the routine 400 reports all or a subset of the insights generated at block 435 to the business and/or the business's agent. For example, the routine 400 can access, analyze, format, or otherwise manipulate one or more of the outputs of the supplemental analytics modules to generate a report of additional insights into the customer call (e.g., using a reporting module of the call analytics system). The routine 400 can display the report on a dashboard or graphical user interface (GUI) presented to the business or the business's agent on a display. In some embodiments, the routine 400 can provide the insights to the business or to the business's agent as information becomes available (e.g., without waiting for outputs of other analytics modules). In these and other embodiments, the routine 400 can update the report and/or the display as additional information becomes available and/or as previous information changes.

Although the steps of the routine 400 are discussed and illustrated in a particular order, the method illustrated by the routine 400 in FIG. 4 is not so limited. In other embodiments, the method can be performed in a different order. For example, any of the steps of the routine 400 can be performed before, during, and/or after any of the other steps of the routine 400. Moreover, a person of ordinary skill in the relevant art will readily recognize that the illustrated method can be altered and still remain within some embodiments of the present technology. For example, one or more steps of the routine 400 illustrated in FIG. 4 can be omitted and/or repeated in some embodiments.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize.

For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology.

From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

We claim:

1. A call analytics system for providing call insights on calls established between customers and businesses, the call analytics system comprising:
   a communication protocol bridge module configured to:
      receive Real-time Transport Protocol (RTP) packets carrying a Voice-over-Internet Protocol (VoIP) call established between a customer and a business;
      extract call audio data from the received RTP packets;
      convert the extracted call audio data into one or more messages having a lossless message format for further processing by a distributed stream-processing platform;
      designate, in the one or more messages, a payload type for the call audio data; and
      provide the one or more messages to the distributed stream-processing platform for processing the call audio data as a message stream to generate a plurality of call insights on the call, at least some of the plurality of call insights being generated by the stream-processing platform in parallel,
      wherein the designated payload type is used by the distributed stream-processing platform to identify an analytics module to generate at least one of the plurality of call insights; and
   a reporting module configured to report at least some of the plurality of call insights to the business.

2. The call analytics system of claim 1, wherein the distributed stream-processing platform is Apache Kafka.

3. The call analytics system of claim 1, wherein each received RTP packet includes a sequence number, a time signature, and a plurality of audio samples of the call.

4. The call analytics system of claim 3, wherein each message of the one or more messages includes a message identifier, a call identifier, and one or more audio packets.

5. The call analytics system of claim 4, wherein each message of the one or more messages includes an indicator of the payload type designating whether the one or more audio packets include pulse code modulation µ-law (PCMU) audio data or dual tone multi-frequency (DTMF) audio data.

6. The call analytics system of claim 4, further comprising an encoder configured to reorder the one or more audio packets within a single message of the one or more messages.

7. The call analytics system of claim 4, further comprising an encoder configured to inject pink noise into a message of the one or more messages.

8. The call analytics system of claim 1, wherein the stream-processing platform further comprises a plurality of analytics modules, the plurality of analytics modules including at least two of:
   a voice activity detection module configured to convert pulse code modulation µ-law (PCMU) audio data of the call audio data in the one or more messages into one or more utterances of speech;
   a digit detect module configured to convert dual tone multi-frequency (DTMF) audio data of the call audio data in the one or more messages into button press values;
   a call purpose module configured to analyze metadata of the call audio data in the one or more messages; or
   a transcription module configured to generate a text transcription of the call audio data in the one or more messages.

9. The call analytics system of claim 1, further comprising supplemental modules configured to generate additional insights on a call, wherein the supplemental modules include at least two of:
   a keyword analysis module configured to spot keywords spoken by the customer, an agent of the business, or both during the call;
   a high intent module configured to indicate whether the customer is likely to purchase a product or service;
   a lost opportunity module configured to identify whether the call was mishandled and abandoned before a purchase;
   a sales v. service module configured to classify the call as a sales call or a service call;
   a sentiment analysis module configured to determine a sentiment of the customer;
   an agent script module configured to determine the agent's performance against a script;
   a text redaction module configured to remove personal information from a text transcription of the call audio data; or
   an audio redaction module configured to remove personal information from call recordings of the call audio data.

10. The call analytics system of claim 1, further comprising cloud object storage and/or a data warehouse where call audio data is stored.

11. A method for providing call insights on calls established between customers and businesses, the method comprising:
   receiving Real-time Transport Protocol (RTP) packets carrying a Voice-over-Internet Protocol (VoIP) call established between a customer and a business;
   extracting call audio data from the received RTP packets;
   converting the extracted call audio data into one or more messages having a lossless message format for further processing by a distributed stream-processing platform;
   designating, in the one or more messages, a payload type for the call audio data; and
   processing, using the distributed stream-processing platform, the call audio data in constructed messages as a message stream to generate a plurality of call insights on the call, at least some of the plurality of call insights being generated by the stream-processing platform in parallel,
   wherein the designated payload type is used by the distributed stream-processing platform to identify an analytics module to generate at least one of the plurality of call insights.

12. The method of claim 11, wherein the distributed stream-processing platform is an Apache Kafka platform.

13. The method of claim 11, wherein each received RTP packet including a sequence number, a time signature, and a plurality of audio samples of the call.

14. The method of claim 13, wherein each generated message includes: a message key, a call identifier, and one or more audio packets.

15. The method of claim 14, wherein each message includes ten audio packets.

16. The method of claim 14, wherein generating each message further includes recording an indicator of the payload type designating whether the audio data comprises pulse code modulation µ-law (PCMU) audio data or dual tone multi-frequency (DTMF) audio data.

17. The method of claim 14, wherein generating at least some messages includes reordering the extracted call audio data in accordance with sequence numbers or time signatures in the received RTP packets.

18. The method of claim 14, wherein generating at least some messages further comprises injecting pink noise in place of call audio data.

19. The method of claim 11, wherein processing the one or more messages to generate a plurality of call insights includes at least two of:
   converting pulse code modulation µ-law (PCMU) audio data of the call audio data in the one or more messages into one or more utterances of speech;
   converting dual tone multi-frequency (DTMF) audio data of the call audio data in the one or more messages into button press values;
   utilizing artificial intelligence or machine learning to analyze metadata of the call audio data in the one or more messages; or
   generating a text transcription of the call audio data in the one or more messages.

20. The method of claim 11, further comprising performing supplemental processing on the call audio data, the supplemental data comprising at least two of:
   spotting keywords spoken by a customer, an agent of the business, or both during the call;
   indicating whether the customer is likely to purchase product or service;
   identifying whether the call was mishandled and abandoned before a purchase;
   classifying the call as a sales call or a service call;
   determining a sentiment of the customer;
   determining the agent's performance against a script;
   removing personal information from a text transcription of the call audio data; or
   removing personal information from call recordings of the call audio data.

* * * * *